INVENTORS
HAROLD SAMUEL
LUTHER VINES
RALPH DOYLE
BY Edward C. Healy
ATTORNEY

2,804,248
LUGGAGE RACKS

Harold Samuels, Luther Vines, and Ralph J. Doyle, San Francisco, Calif.

Application May 14, 1956, Serial No. 584,638

2 Claims. (Cl. 224—42.1)

This invention relates to improvements in luggage racks of the type that is secured to the top of the body portion of an automobile for conveniently retaining and transporting various kinds of luggage, sporting equipment and other articles.

An object of the invention is to equip the rack with vacuum cups and fastening straps that will securely yet detachably retain the rack in an operative position that will not deface, weaken or mar the car top.

Other objects of the invention are to employ reinforcing means to strengthen the cross bar of the rack; the utilization of a unique bracket construction and a novel spindle, both interposed between the cross bar and the vacuum cups, and the provision of spring means adapted to cooperate with the spindle that takes up any slack in the straps that function to secure the rack by hook ends to the gutter portions of the automobile top.

A further object of the invention is the provision of a luggage rack of the character described that is simple in construction, economical to manufacture, easy to operate, strong, durable and highly efficient and serviceable in use.

Other objects and advantages will be apparent during the course of the following description.

Figure 1:
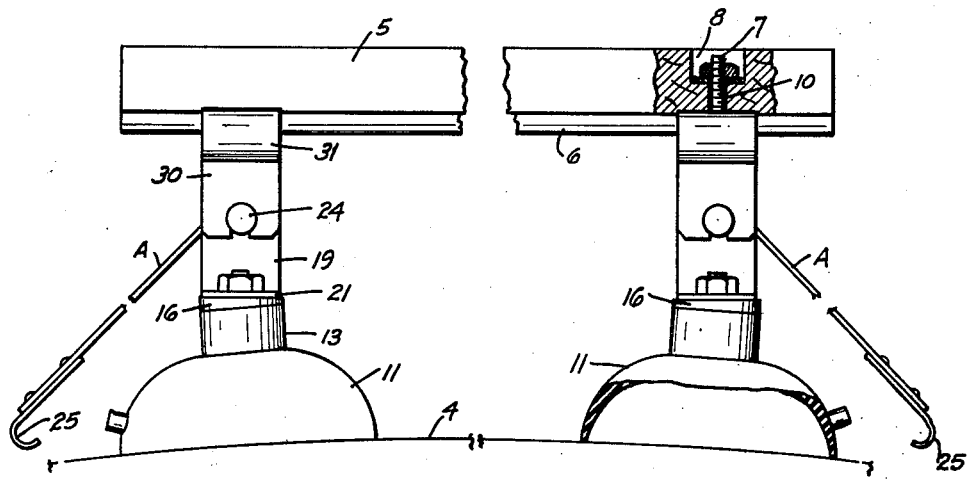
Figure 2:
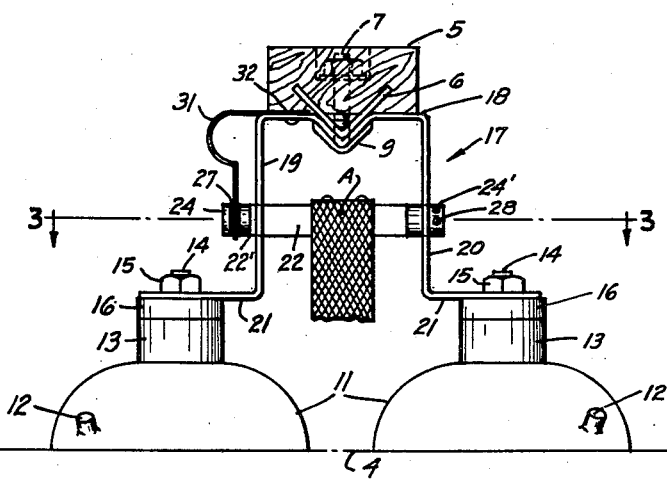
Figure 3:
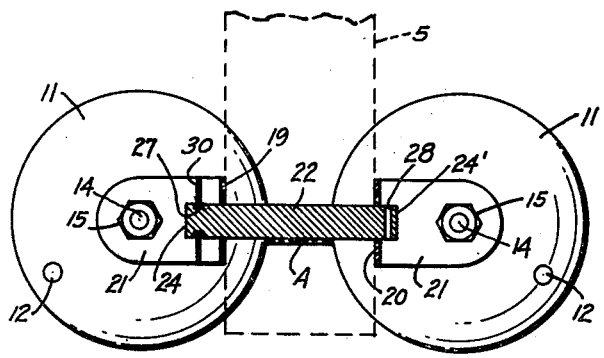

In the accompanying drawings forming a part of this specification and in which like numerals are employed to designate like parts throughout the same, Fig. 1 is a side elevational view of the luggage rack constructed in accordance with our invention and disclosing the same as positioned on the top of the body portion of an automobile, Fig. 2 is a front elevational view of rack, and Fig. 3 is a horizontal sectional view through the rack, the view being taken on the line 3—3 of Fig. 2.

In the accompanying drawing forming a part of this specification and in which like numerals are employed to designate like parts throughout the same, the numeral 4 designates the top of the body of an automobile on which our invention is positioned. The present luggage rack embodies in its construction a horizontal wooden cross bar 5 that is supported transversely relative to the top 4, which bar supports luggage or has connected thereto, by auxiliary straps, various articles to be transported. The said bar is reinforced by a longitudinally extending V-shaped metal strip 6 that has its upper ends embedded in the material of the cross bar. To provide for ease of assembly of the parts and a positive connection between the bar and the understructure of the luggage rack, a bolt and nut connection 7 is employed. It will be noted that the bolt extends upwardly through the base of the bar, and that access to the nut for tightening the same is obtainable through the medium of a socket 8 formed in the upper portion of the bar. The bolt is adapted to pass through the strip and enter an opening 10 that is in communication with the socket 8. The said bolt is equipped with a V-shaped head or flange 9.

The numeral 11 designates one of a plurality of vacuum cups provided with a tit 12 for convenience in manually breaking the vacuum when desired. The cup is provided with a hollow body and a solid hard rubber head portion 13 on which is mounted a threaded vertical bolt 14 provided with a locking nut 15. It will be noted that four of these cups are provided in the rack structure, and are in spaced relationship when they function for their frictional fit at four points on the automobile top adjacent to the side edges thereof. To compensate for the contour of the top surface, a tapered washer 16 is employed (see Fig. 1) and is adjustably retained in position relative to the head of the cup by the bolt and nut connections 14 and 15.

The numeral 17 indicates, as a whole, an inverted U-shaped metal bracket that embodies in its construction a centrally depressed apertured top wall 18 and apertured vertical side arms 19 and 20. Each arm has integrally formed therewith an apertured horizontal foot portion 21, the latter adapted to be retained between the cup heads 16 and the bolt and nut connections 14 and 15.

It will be noted that the bottom of the V-shaped strip 6 is seated in the depression that is provided in the top wall of the bracket, to thus provide a compact and sturdy arrangement of these parts of our device.

The numeral 22 designates the main body portion of a spindle that is of a square configuration throughout the greater portion of its length and has formed thereon pointed shoulders 22'. The said body portion beyond the shoulders terminates in rounded extremities or ends 24 and 24'. It will be noted that the upper end of a strap A is riveted or otherwise secured to one face of the spindle body, centrally thereof. The lower end of the strap either terminates in or has connected thereto a hook portion 25 that is adapted to be secured in the gutter of the automobile top, which gutter lies adjacent to the marginal edge of the said top surface. It is to be observed that these straps when under proper tension spread the vacuum cups and force the same into intimate holding contact with the automobile top.

It will be apparent that due to the employment of the straps and the vacuum cups both, a dual and most effective means have been provided for detachably securing the rack in an operative position, which rack can be easily and quickly removed when the occasion demands. Furthermore, by the expediency employed for securing the rack any danger of accidental displacement of the rack from its operative position will be reduced to a minimum.

Buckles and tongues are generally employed in conjunction with perforated straps to effect a tightening of the straps. This arrangement is expensive and the straps, being perforated, quickly tear, become worn and subsequently break. To accordingly overcome these annoyances we have devised the present simplified strap tightening arrangement.

We wish to point out that we can effectively tighten the straps on the rotatable spindle to the desired degree or can readily produce a slack in the straps when the occasion demands, such as removing the rack from the car. To accomplish these objects we propose to associate with the bracket a unique spring element, to be later described, that cooperates with the spindle and its rounded extremities. Again referring to the rounded ends of the spindle, it will be noted that the end 24 is provided with a circumferential groove 27 and the end 24' has formed therein spaced openings or slots 28. Adapted to be received in the annular recess is the bifurcated end portion 30 of a partially bowed strong metal spring 31, preferably made of bronze material. This spring is equipped with an upper horizontal portion 32 that partially underlies the bar 5 and is in turn riveted to the top wall of the bracket 17.

In practise after the rack has been positioned on the top of the automobile for operative purposes, the hook ends of the straps are adjusted for position on the gutter portion of the car top. If the strap is too long or too short for a firm and rigid connection of the rack to the gutter, manual, inward actuation of the spring and the subsequent movement of the spindle will overcome this difficulty. The action referred to is the use of finger pressure on the end of the rounded extremity 24, which pressure depresses the bifurcated end of the spring to accomplish limited inward movement of the spindle end 24 through the aperture of arm 19 until the pointed shoulders 22' of the square body of the spindle abut the inner surfaces of the bracket arm 19. The spindle is then rotated to the desired degree by the insertion of a pointed small implement in any of the cross slots or openings 28 that are provided in the rounded end 24' of the spindle. Any slight movement imparted to the spindle by the rotation employed will cause the tip ends of the shoulders to move off center or out of alignment with the apertures of the arms 19 and 20 and the tip ends will contact the inner surfaces of the arms 19 and 20 to retain the spindle in a fixed position for the subsequent manipulation of the latter.

Thus any danger of the longitudinal movement of the spindle will be eliminated, until the square ends of the spindle are again in alignment with the apertures in the arms of the bracket. When the spindle is so positioned or when this condition exists the inherent expansion of the bifurcated portion of the spring seated in the circumferential groove will cause the parts of the spindle to assume their normal positions, as illustrated to advantage in Fig. 2 of the drawing.

Since the upper end of the strap is secured to the spindle any desired "take-up" or slack in the strap can be compensated for by the unique means employed to accomplish the wrapping or unwrapping of the fixed end of the strap on the spindle.

It is to be understood that the form of our invention herewith shown and described is to be taken as the preferred example of the same and that changes relative to the size, shape, material and arrangement of parts may be readily resorted to without departing from the spirit of the invention or the scope of the subjoined claims.

Having thus described our invention, we claim:

1. In a car top carrier for an automobile adapted to be detachably secured to the car top and held in place by a plurality of straps terminating in hooks adapted to hook into a gutter arranged along the marginal edge of a car top, the improvement comprising tightening means for said straps comprising a bracket on said carrier having two spaced side members, each of said members having an aperture therein adapted to receive a spindle, said spindle having a square configuration in a central body portion thereof, defining square shoulders terminating in rounded ends, a first end of said spindle having a circumferential groove therein, a spring connected at one end to said carrier, and terminating in an opposite end, which is bifurcated and seated in the groove of the spindle, said spring urging said spindle into a position wherein said square shoulders engage in the aperture of one of said side members, said spindle being shiftable laterally by pressure on the first end counteracting the effect of said spring and permitting said spindle to rotate.

2. The structure of claim 1 wherein said spindle has at its second rounded end a series of spaced openings for receiving an implement for manually rotating the spindle.

References Cited in the file of this patent
UNITED STATES PATENTS

| | | |
|---|---|---|
| 2,551,351 | Swenson | May 1, 1951 |
| 2,600,082 | Sumner | June 10, 1952 |

FOREIGN PATENTS

| | | |
|---|---|---|
| 216,092 | Switzerland | Nov. 17, 1941 |